Oct. 12, 1965 H. METZRATH 3,211,299
DEVICE FOR EXCHANGING HELICOPTER ENGINES
Filed Jan. 28, 1964 6 Sheets-Sheet 1

INVENTOR.
HEINRICH METZRATH
BY
Nolte & Nolte
ATTORNEYS

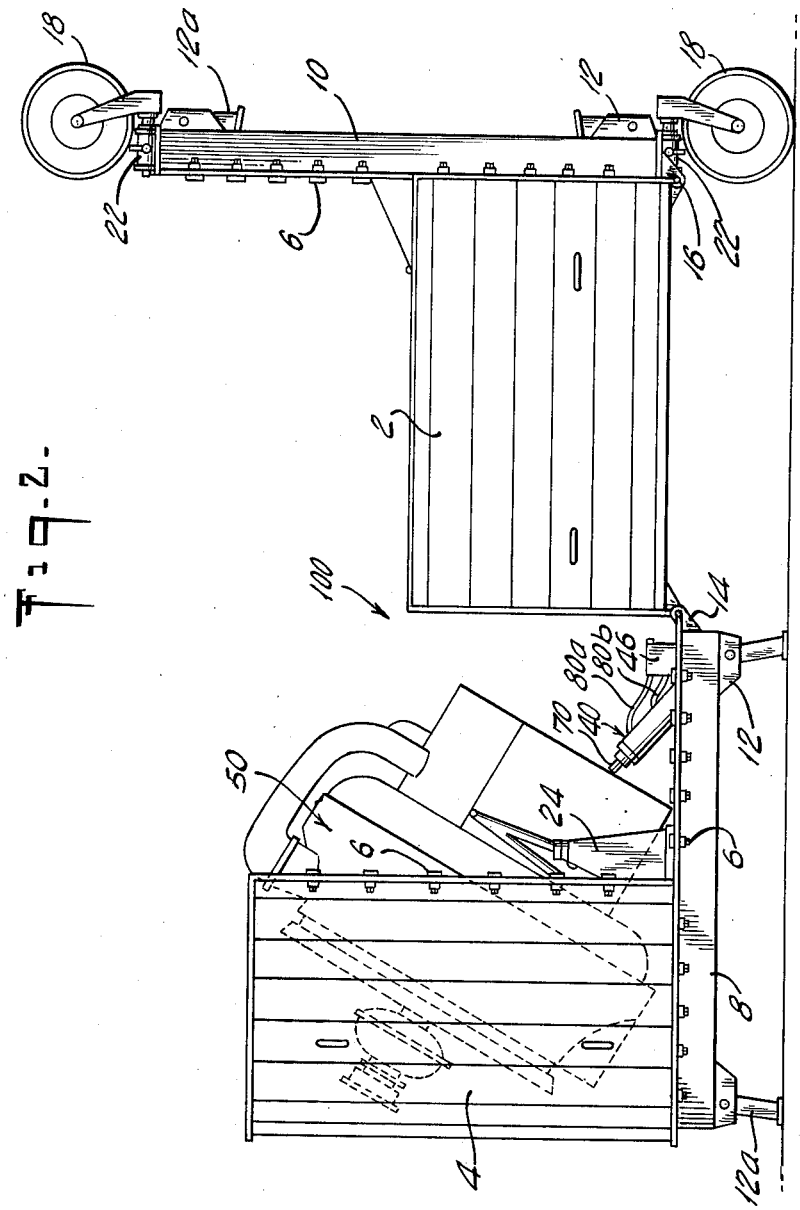

Oct. 12, 1965  H. METZRATH  3,211,299
DEVICE FOR EXCHANGING HELICOPTER ENGINES
Filed Jan. 28, 1964  6 Sheets-Sheet 3
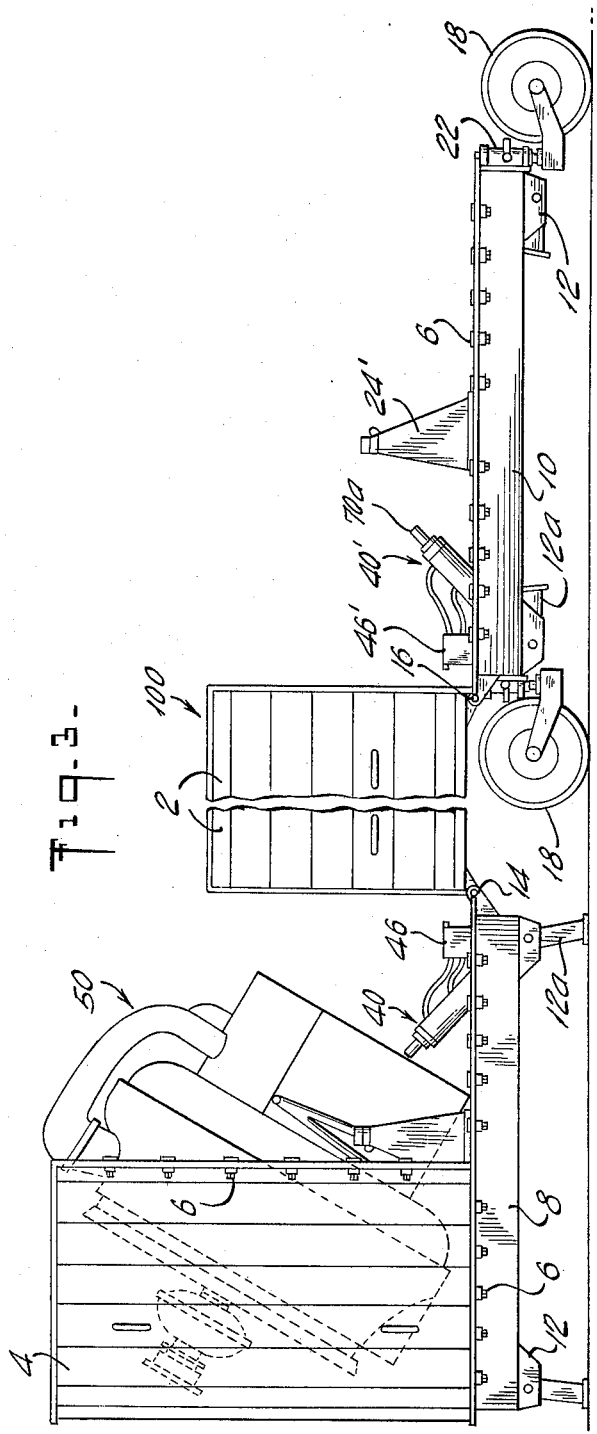
INVENTOR.
HEINRICH METZRATH
BY
Nolte & Nolte
ATTORNEYS Oct. 12, 1965 H. METZRATH 3,211,299
DEVICE FOR EXCHANGING HELICOPTER ENGINES
Filed Jan. 28, 1964 6 Sheets-Sheet 4
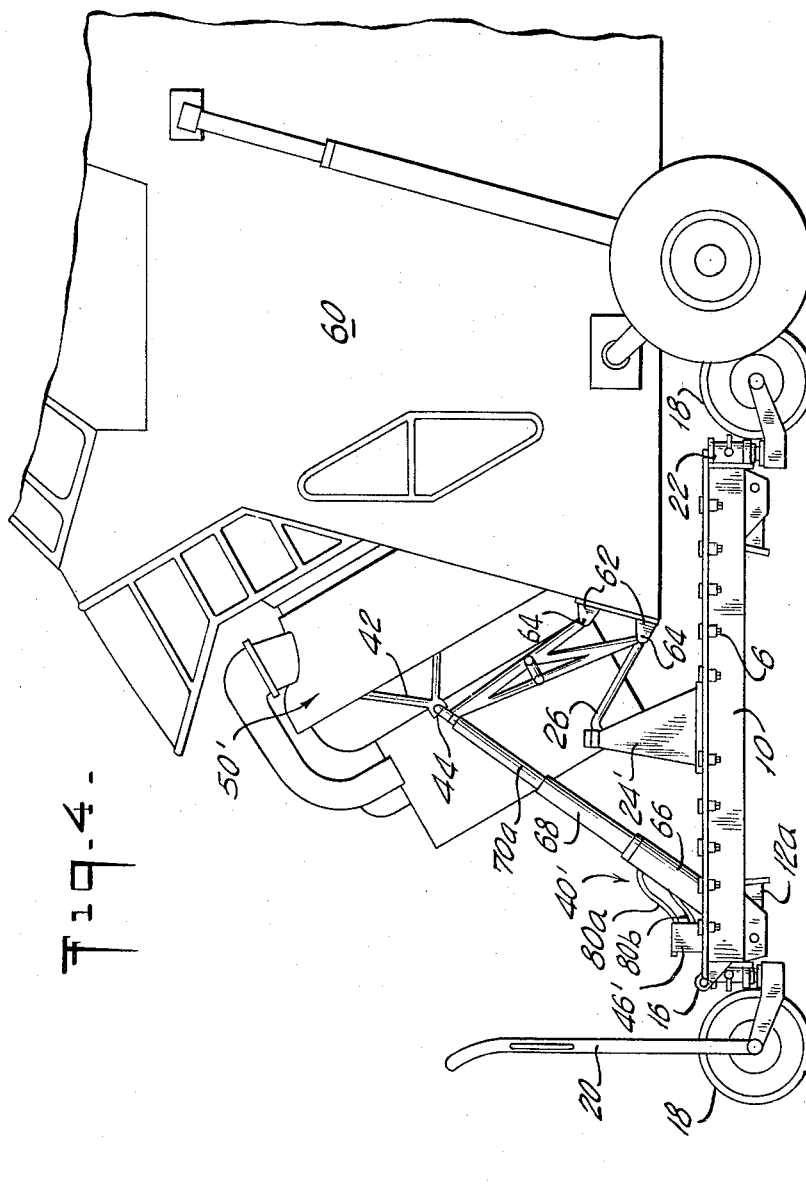
INVENTOR.
HEINRICH METZRATH
BY
Nolte & Nolte
ATTORNEYS

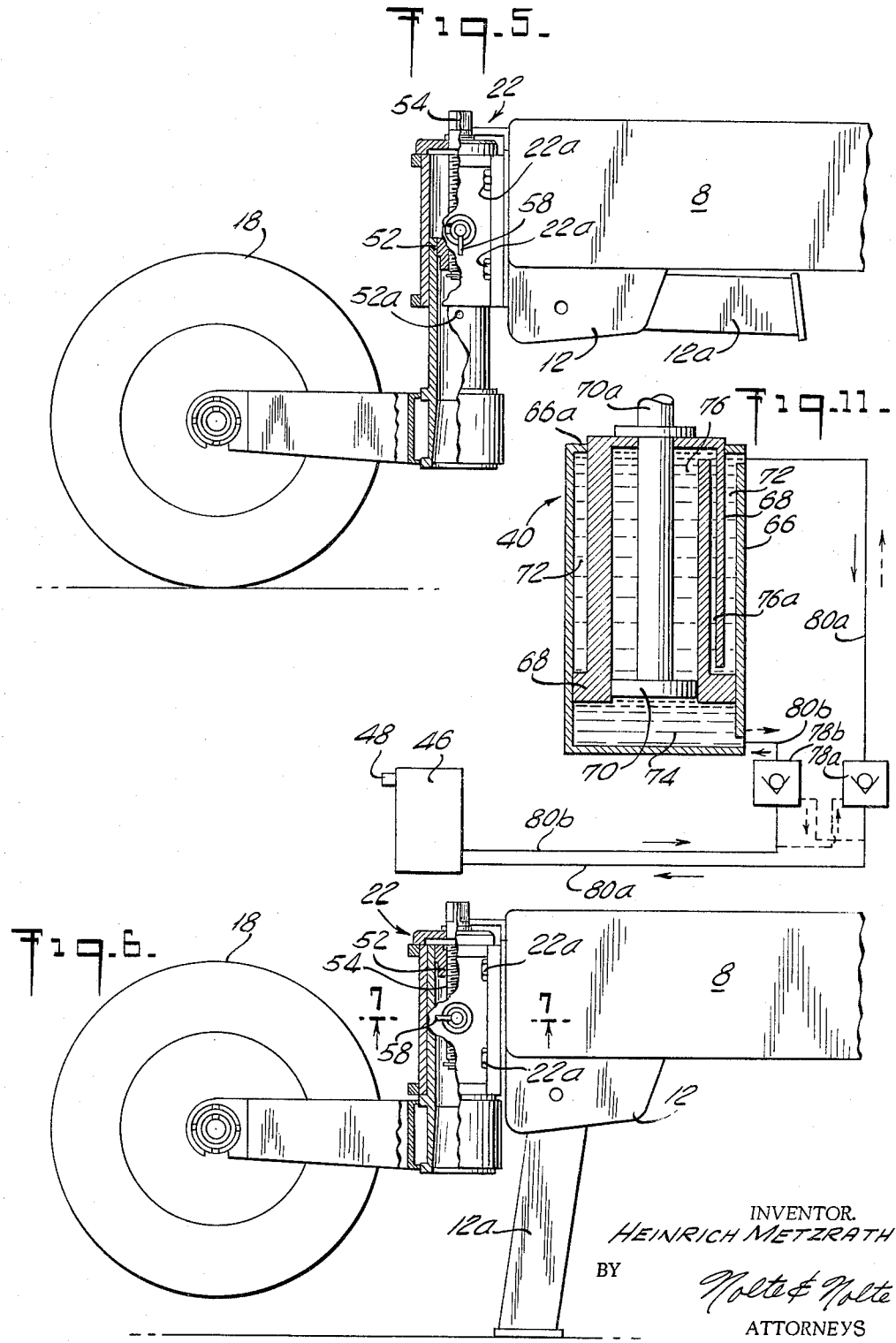

Oct. 12, 1965 H. METZRATH 3,211,299
DEVICE FOR EXCHANGING HELICOPTER ENGINES
Filed Jan. 28, 1964 6 Sheets-Sheet 6

INVENTOR.
HEINRICH METZRATH
BY
Nolte & Nolte
ATTORNEYS

United States Patent Office 3,211,299
Patented Oct. 12, 1965

3,211,299
DEVICE FOR EXCHANGING HELICOPTER ENGINES
Heinrich Metzrath, Kassel, Germany, assignor to Henschel Flugzeug-Werke A.G., Kassel, Germany
Filed Jan. 28, 1964, Ser. No. 341,491
15 Claims. (Cl. 214—1)

The present invention relates to transport containers and devices for exchanging helicopter engines at the location of a breakdown.

The engines of aircraft of any kind, including helicopters, were exchanged heretofore in their entirety in aircraft plants if the damage or disturbance of the engine could not be remedied within a short time. The requirement for exchanging the entire engine made it, however, necessary that the aircraft be haulted to an aircraft plant. This mode of procedure is time consuming and frequently not workable at all when, for instance, the emergency landing of the craft occurs in an inaccessible landscape spot, e.g., in the jungle or the mountains.

It has already been proposed to provide a device with the aid of which a damaged engine which is to be removed can be dismantled after landing at some inaccessible spot, and can be replaced by a new one, and at that within a relatively short time.

For this purpose a suitable container, transportable by air, was selected which was to contain an assembled engine, ready for use, an empty frame for receiving the engine to be removed, and hand-operated hydraulics as an auxiliary device for dismantling and mountnig of the engines.

It has been found, however, that the exchange of the damaged engine against a new one is not a simple operation at the landing place of the craft, because the latter usually takes a more or less inclined or tilted position subsequent to landing, according to the circumstances in which it settles in the emergency landing area.

It is the object of the present invention to provide a device for exchanging aircraft engines, particularly those of helicopters, irrespective of the position of the craft on the ground.

It is a further object of the invention to provide a transport container adapted for airborne use, fitted with the necessary hydraulic and other means for removing and replacing such engines in areas otherwise inaccessible by land vehicles.

According to one of the major features of the invention, the container has two hinged portions held together by quick-release locking means. The entire structure rests on a supporting frame adapted to be fitted with wheels, at least one of which may have a swivel handle for maneuvering the container.

According to yet another feature, lifting jacks or spindles are provided which, in conjunction with releasable supports, provide a connection between the frame portions and the wheels. Both the bottom and the top frame portions, adapted to hold an intact engine and an incapacitated engine, respectively, are being fitted with said elements in the course of the use of the transport container.

Still another feature of the invention relates to a novel hydraulic control system adapted to lift and lower appropriate struts by which the engines are handled. Owing to a novel plunger control system, either of the hydraulic pistons within the container is capable of being locked in any intermediate or terminal position, even while carrying the load of the engine.

Other objects, features and advantages of the invention will be appreciated and more fully understood with reference to the following detailed description, when considered with the accompanying drawings, wherein:

FIG. 2 is a similar elevational view of the device after opening, the upper container portion being titled down;

FIG. 3 shows a further operational stage wherein the top frame of the upper container portion is also lowered;

FIG. 4 illustrates the removal of a defective engine by means of the upper container portion (right-hand side of FIGS. 2 and 3), after the device has been pushed under the damaged aircraft;

FIG. 5 is a partial elevational view of the lower frame with one of the wheel attachments and journals for supporting the device, the respective leg being raised;

FIG. 6 is a view similar to FIG. 5 wherein the leg is lowered for supporting the device, the wheel being raised out of contact from ground;

FIG. 11 is a schematic, partly sectional view of one of the pistons of the hydraulic system.

Figure 1:
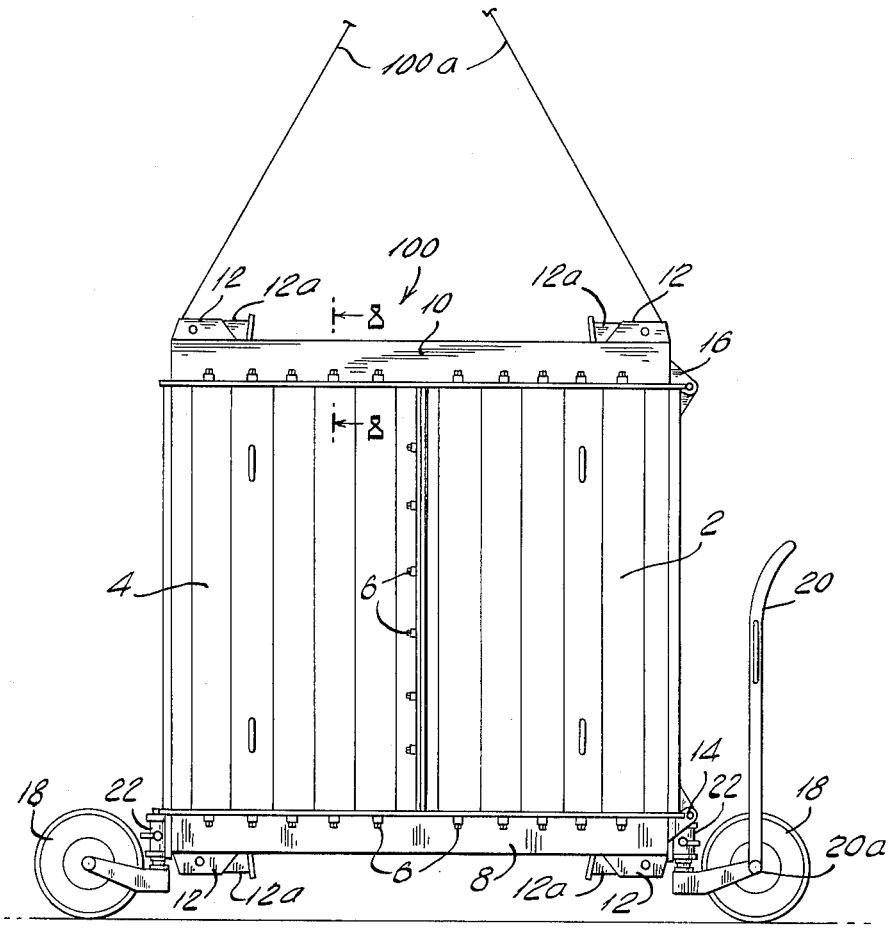
FIG. 1 is a front elevation of the closed transport device according to the invention, as it is lowered or dropped near a damaged aircraft.

As illustrated in FIGS. 1 through 4, the inventive device consists of a two-part container 100, respective right-hand and left-hand side portions 2, 4 of which are held together by quick-release locks 6, to be described hereunder in more detail. Portions 2, 4 rests on a lower carrying frame 8 with which they are likewise connected through releasable locks 6. The container portions have a top frame 10 similar to frame 8. The upper frame 10, together with container half 2, can be pivoted about hinges 14 provided on the lower frame 8; additionally, frame 10 can also be swung about hinges 16 provided thereon, with respect to container portion 2 itself, after the locks 6 have been loosened and/or removed.

Figure 8:
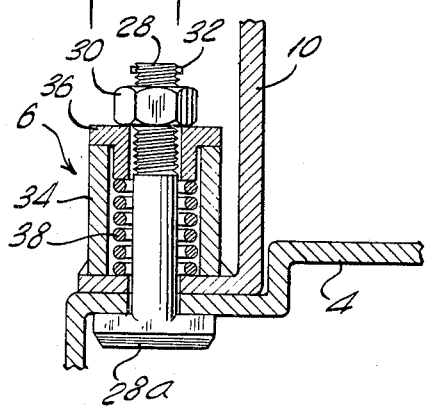
FIG. 8 is a sectional view of one of the closed quick-release locks between the container portions, taken along line 8—8 of FIG. 1.
Figure 9:
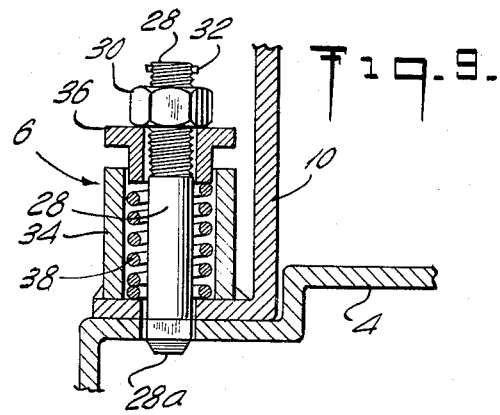
FIG. 9 is a view similar to FIG. 8, with the lock partly opened.

As shown in FIGS. 8 and 9, each lock 6 comprises a hammer screw 28 having a nut 30 on one extremity, secured by a retaining ring 32, and an elongated head 28a on the other, the latter passing through respective elongated cut-outs in the adjacent walls of container portion 4 and frame 10. Head 28a acts as a locking pin if it is in the position shown in FIG. 8, whereby members 4, 10 are held together. A sleeve 34 surrounds screw 28, and carries a centering disc 36. In the space within sleeve 34, there is lodged a helical spring 38 which urges disc 36, nut 30 and screw 28 away from the cut-out portion in frame wall 10.

Upon having loosened nut 30 from the tightened position shown in FIG. 8, and turned thereafter screw 28 by 90 degrees to the position of FIG. 9, disc 36 will allow the quick-release lock 6 to be completely disengaged from the two cut-outs. When all the locks are released, this allows frame 10 to be swung about its hinges 16. The arrangement of the other locks 6, between each pair of the elements 2, 4 and 8, 10, is identical with that just described. FIG. 1 shows all locks secured, while in FIGS. 2 and 3 some are open, some disengaged; finally, FIG. 4 shows open locks only.

Both frames 8, 10 have sockets 12 for accommodating swiveling legs or supports 12a (best seen in FIGS. 5 and 6). The two frames also may be provided with wheels 18, as shown in some of the figures. One of the wheels, preferably the one in front of the container 100, is supplemented by a swivel handle 20 (FIGS. 1 and 4). This handle has at its lower end a terminal portion 20a adapted optionally to be clipped on and removed from the spindles about which wheels 18 rotate. This may be by way of a spring-biased arrestment (not shown in detail) capable of engaging a circular groove in said spindles.

Figure 7:
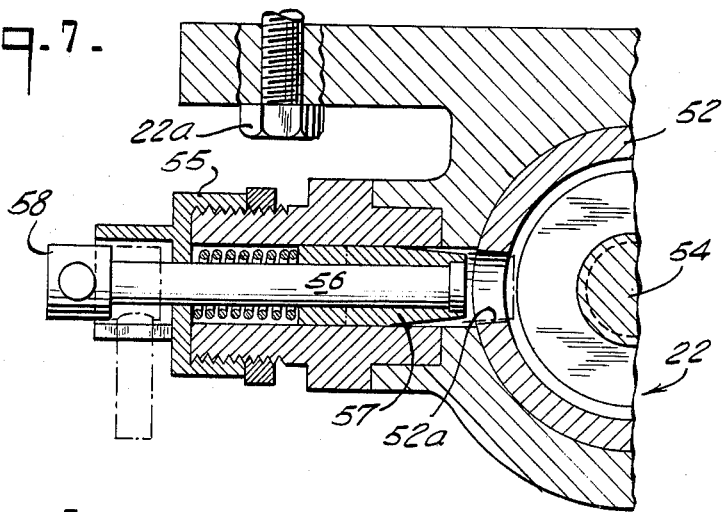
FIG. 7 is a horizontal sectional view of the spindle system which serves selectively to lower and raise the wheels, taken in the plane of line 7—7 in FIG. 6.

Journals 22 are provided for each of the wheels 18, and can optionally be secured to threaded bores provided in the bottom and top frames 8, 10 by the aid of bolts or screws 22a (best seen in FIGS. 5-7). Either of the carrying frames 8, 10 can thus be made rollable, as long as the spindle mechanism within journals 22 is in its extended position (FIG. 5, to be explained hereunder).

FIGS. 5 and 6 show the mechanism of one of the journals 22, in respective extended and withdrawn positions, the former with the leg 12a raised, and the latter with the wheel 18 raised and the leg lowered for supporting the device. Each journal comprises a threaded sleeve mechanism 52 vertically displaceable within the outer journal housing, and an inner threaded spindle 54 which engages a mating threaded nut secured inside the sleeve 52 at its top end. Spindle 54 has a square-shaped top extension which can be turned with a key or the like tool.

In at least one of the end positions, the mechanism 52 can be immobilized with respect to the housing of journal 22 by means of a locking bolt 56 surrounded by a spring-biased engaging member 57 (see FIG. 7), adapted to engage a recess 52a of outer sleeve 52 which carries the wheel structure 18. A handle 58 actuates the bolt 56; a cap 55 prevents the bolt to be pushed outward by spring pressure.

FIG. 5 and the solid-line portion of FIG. 7 represent the unlocked condition while FIG. 6 and the broken-line position of FIG. 7 show the system when unintentional movement of mechanism 52 and wheel 18 with regard to journal 22 is avoided by locking engagement between sleeve 52 and member 57. Sleeve recess 52a is visible in FIG. 5, too. Bolts 22a are to be loosened and removed only upon having set down the container 100 on legs 12a, with the wheels raised out of contact with ground (as in FIG. 6).

The whole assembly, i.e. the container 100 including a new, operative engine 50, one or two hydraulic piston systems 40, 40', and the rest of the auxiliary equipment (e.g. tools, etc.) can be brought to the emergency landing place by land, water, or, if need be, by air, as the circumstances may require. If the container is set down by a helicopter (using, for example, ropes 100a, as shown in FIG. 1), the replacement of the defective engine is carried out in the following manner:

The container 100 is raised by means of the lifting mechanism 52, 54 built into the supporting journals 22. The engagement may be locked with handle 58 in the manner already described. The supports 12a are then swung out and when the container rests thereon (FIG. 3), the locks 6 of the container halves 2, 4 are unlocked so that portion 2 can be swung around pivots 14. The three wheels 18 are removed from frame 8 and attached by means of bolts 22a to the upper carrying frame 10.

After loosening the quick-release locks 6 between the upper frame 10 and the container portion 2, the upper frame can also be set on the ground, after swinging same about hinges 16 (FIG. 3). Thereupon bearing blocks 24, 24' and hydraulic struts 40, 40' are mounted on the respective frames 8, 10. These elements have been accommodated, together with one or two pumps 46, 46' within the container.

The frame 10, ready for use, is then towed under the bow of the force-landed aircraft 60. FIG. 4 illustrates this condition, with wheel 18 and handle 20 to the left.

The hydraulic systems 40, 40' have a structure allowing them to be fixed in a fully expanded and also in any intermediate position, to be described later in full. This is important because neither the aircraft nor the frame 10 pushed thereunder are always in a horizontal position with regard to each other. This allows the new engine 50 to be inserted after the damaged one, numbered 50', has been removed.

Figure 10:
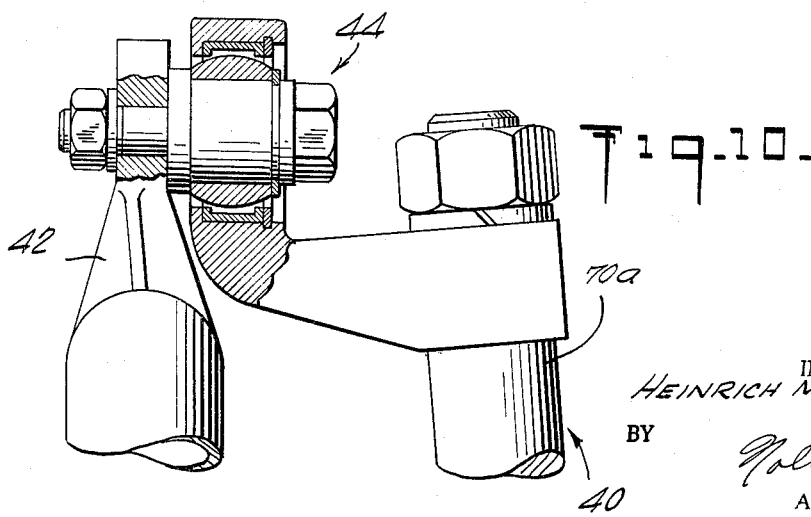
FIG. 10 is a partial elevational view of FIG. 4, illustrating the swivel bearing between supporting members.

For performing these functions, the following equipment is provided: FIG. 10 illustrates the connection between a piston rod 70a of the strut 40 (40' not being illustrated in detail) with a strut member 42 provided on the engine, by means of a swivel bearing 44 which includes a special bolt for connecting the hinged members.

The bearing blocks 24, 24' have to be connected with an engine suspension member 62 (FIG. 4), by means of distance members or straps 26. After having attached the members 42 to the exhaust flanges of the cylinders and connected them with the hydraulic struts by means of bearings 44 and its bolts, and having disengaged a clamping bolt 64 from the engine 50', the latter can be lowered to the frame 10 by lowering the piston or strut 40 in a manner to be described hereunder.

Thereafter the frame 10 may be withdrawn from the helicopter and set onto its supports 12a. When the three wheels 18 are fixed to the lower frame 8, the towing in and assembling or mounting in of the new engine 50 is effected in the inverse order.

In FIG. 11, one of the hydraulic strut systems 40 is illustrated in detail. In a cylinder 66, two plungers are reciprocable, namely, an outer plunger 68 and within the latter another plunger 70 having a pistol rod 70a rigid therewith. Between the outer wall of cylinder 66 and plunger 68, there is a fluid space 72; inside plunger 68, and around plunger 70, there is another fluid space 76; at the same time, both plungers are acted upon from below by the fluid contained in a lower cylinder space 74.

The engaging surface of the outer plunger 68 is larger than that of the inner plunger 70 owing to the difference in area between the outer annular surface of relatively larger diameter, for the former, and the inner circular surface of smaller diameter, for the latter, above space 74. Therefore, the pressure of the hydraulic fluid, e.g. oil, produced by pump 46 and introduced through a valve and pipe system to be explained somewhat later, will first move plunger 68 upward until its upper circular surface lies against a head portion 66a of cylinder 66.

Now the oil within space 72 will be pressed out from the cylinder 66 and forced back to the pump. In a somewhat retarded manner, the other plunger 70 is likewise urged upward whereby the oil is being pressed from space 76 through a channel 76a into space 72.

Spring-loaded valves 78a, 78b are provided for keeping fluid pressure constant at all times. This will even prevail when the pump 46 no longer works because said valves shut off the return flow from the plungers and spaces therebetween. Respective conduits or pipes 80a, 80a have been shown between pump 46 on the one hand and the spaces 72, 74 on the other.

In order to be able to push back or lower the plungers 70, 68, a broken-line by-pass circuit has to be connected between valves 78a, 78b and their conduits so that the fluid can flow in opposite directions, to and from the pump 46. The fluid flow required for raising the plungers is indicated by solid-line arrows, while the lowering or pushing back requires flow paths as shown in broken lines.

In the described manner, the piston rod 70a can be immobilized and securely supported in any desired intermediate or terminal position, without need for any auxiliary mechanical means. When the pump is not actuated, the pressure on both sides of the plungers is held at the same level, owing to the provision of the valves 78a, 78b which do not permit backflow of the fluid. Since the plungers 68, 70 are acted upon by fluid pressure, their respective positions can be finely adjusted.

Although one hydraulic system 40 has only been shown and described, it will be understood that system 40′ is connectable to the same pump, conduits and valves in a parallel fashion, if simultaneous operation is required. Small two-way valves (not shown) may be provided in bifurcating conduit portions if the two cylinders and plunger systems have to be acted upon independently.

The conduits 80a, 80b are preferably made from flexible hose capable of withstanding high pressures, and are attached, for example, to the bottom of lower frame 8. The pump has a lateral lever 48 to which an extension or handle may be attached for operating the pump.

The foregoing disclosure relates only to a preferred embodiment of the invention which is intended to include all changes and modifications of the exemplary details described within the scope of the invention as set forth in the appended claims.

I claim:

1. A device for exchanging aircraft engines and the like, comprising, in combination, a portable two-part container for carrying one of said engines therein, a lower and an upper frame portion hingedly attached to one of said container parts, said frame portions being adapted to be swung into a substantially aligned continuous position, a plurality of wheels for supporting the device and adapted for connection with either one of said frame portions, a plurality of support means swivably attached to both of said frame portions, and hydraulic means for selectively lowering a defective engine into the device and raising a working replacement engine therefrom.

2. A device according to claim 1, further comprising a plurality of quick-release locks between at least one of said container parts and said frame portions, allowing optionally partial and complete engagement and disengagement between the said parts and portions.

3. A device according to claim 2, wherein each of said locks comprises a spring-biased hammer screw having an elongated head, the respective container parts and frame portions being provided with substantially aligned longitudinal cut-outs for passage of said elongated heads therethrough, whereby said engagement and disengagement can be accomplished by turning said elongated heads by about 90 degrees with respect to said cut-outs.

4. A device according to claim 1, further comprising means for removably attaching said wheels to said frame portions.

5. A device according to claim 4, further comprising journal means for each of said wheels and lifting means associated therewith for manually regulating the distance between said wheel and the frame portion to which it is attached.

6. A device according to claim 5, wherein said lifting means comprises a reciprocable sleeve member to which said wheel is secured, and a rotatable spindle member in mating engagement with said sleeve member, the relative position between said members being manually adjustable for regulating said distance.

7. A device according to claim 6, further comprising locking means forming part of said journal means and adapted optionally to immobilize said sleeve member in at least one operative position with respect to said journal means.

8. A device according to claim 1, further comprising at least one bearing means supported by one of said frame portions, at least one distance member for rigidly connecting the aircraft containing said defective engine to said bearing means, and strut means connected between said hydraulic means and said defective engine, so that the latter may be lowered, and removed from said aircraft and lodged within the device.

9. A device according to claim 1, wherein said hydraulic means comprises at least one cylinder means having double-action plunger means therein, pump means for supplying fluid under pressure to said cylinder means and back to said pump means, conduit means between said pump means and said cylinder means, and at least one valve means in said conduit means for allowing said fluid to pass in an operational direction only.

10. A device according to claim 9, wherein said plunger means includes a reciprocable first plunger and a second plunger reciprocable with respect to said first plunger.

11. A device according to claim 10, wherein said cylinder incorporates a first fluid space in contact with both of said plungers, a second fluid space surrounding said first plunger and a third fluid space between said first and said second plungers, one line of said conduit means leading to said first space while the other line thereof is connected to said second space.

12. A device according to claim 11, wherein the wall of said first plunger has a channel therein for providing a passage for said fluid between said second and said third spaces.

13. A device according to claim 12, wherein said valve means comprises bypass means for allowing said fluid to pass in a sense opposite to said operational direction.

14. A device according to claim 13, further comprising piston means rigid with said second plunger and connectable to said defective engine for selectively lowering and raising the same.

15. A device according to claim 14, further comprising strut means interposed between said piston means and said defective engine, and a distance member for rigidly connecting the aircraft containing said defective engine to one of said frame portions.

No references cited.

HUGO O. SCHULZ, *Primary Examiner.*